(12) United States Patent
DeFrancesco et al.

(10) Patent No.: US 9,331,921 B2
(45) Date of Patent: *May 3, 2016

(54) INTERNET CONNECTED HOUSEHOLD IDENTIFICATION FOR ONLINE MEASUREMENT AND DYNAMIC CONTENT DELIVERY

(71) Applicant: SPECIFIC MEDIA LLC, Irvine, CA (US)

(72) Inventors: Brian C. DeFrancesco, Trabuco Canyon, CA (US); Timothy C. Vanderhook, Newport Beach, CA (US); Christopher J. Vanderhook, Yorba Linda, CA (US)

(73) Assignee: Vindico, LLC, Irvine, CA (US)

( * ) Notice: Subject to any disclaimer, the term of this patent is extended or adjusted under 35 U.S.C. 154(b) by 126 days.

This patent is subject to a terminal disclaimer.

(21) Appl. No.: 13/895,587

(22) Filed: May 16, 2013

(65) Prior Publication Data

US 2013/0311649 A1    Nov. 21, 2013

Related U.S. Application Data

(60) Provisional application No. 61/648,341, filed on May 17, 2012.

(51) Int. Cl.
*G06F 15/16* (2006.01)
*H04L 12/26* (2006.01)
*H04L 29/12* (2006.01)
(Continued)

(52) U.S. Cl.
CPC ............ *H04L 43/08* (2013.01); *H04L 12/2809* (2013.01); *H04L 29/12066* (2013.01); *H04L 43/04* (2013.01); *H04L 61/00* (2013.01); *H04L 61/2007* (2013.01); *H04L 61/2514* (2013.01)

(58) Field of Classification Search
USPC .......................... 709/203, 223–229, 250, 245
See application file for complete search history.

(56) References Cited

U.S. PATENT DOCUMENTS 5,964,839 A    10/1999   Johnson et al.
6,151,601 A    11/2000   Papierniak et al.
(Continued)

FOREIGN PATENT DOCUMENTS

KR   20090000995    1/2009
WO   2006058274     6/2006
WO   2010120359    10/2010

OTHER PUBLICATIONS

Crawford, Gregory S., "Household Internet Use: Implications for Online Competition and Market Structure", Dept. of Economics, Duke University, 1999. http://ftp.econ.duke.edu/gsc/ecfacts.pdf.
(Continued)

*Primary Examiner* — Zarni Maung
(74) *Attorney, Agent, or Firm* — Gates & Cooper LLP

(57) ABSTRACT

A method, apparatus, system, and computer readable storage medium provide the ability to identify an internet connected household (ICH). An Internet Protocol (IP) address is received at an Internet entity. Determinations are made regarding whether the IP address belongs to an Internet Service Provider (ISP) that provides residential internet service, whether device activity from the IP address does not exceed a defined activity threshold, and whether an IP assignment age for the IP address is greater than a defined threshold age. Based on the determinations, the IP address can be identified as belonging to an ICH or not.

22 Claims, 5 Drawing Sheets

(51) Int. Cl.
*H04L 12/28* (2006.01)
*G06F 12/00* (2006.01)

(56) References Cited

U.S. PATENT DOCUMENTS

| | | | |
|---|---|---|---|
| 6,427,170 | B1 | 7/2002 | Sitaraman et al. |
| 6,792,458 | B1 | 9/2004 | Muret et al. |
| 6,978,270 | B1 | 12/2005 | Carty et al. |
| 7,039,699 | B1 | 5/2006 | Narin et al. |
| 7,600,016 | B2 | 10/2009 | Bean |
| 8,214,486 | B2 | 7/2012 | Britton et al. |
| 8,533,322 | B2 | 9/2013 | Chamberlain et al. |
| 8,996,727 | B2 * | 3/2015 | DeFrancesco et al. ....... 709/245 |
| 2002/0128925 | A1 | 9/2002 | Angeles |
| 2004/0073533 | A1 | 4/2004 | Mynarski et al. |
| 2005/0033641 | A1 | 2/2005 | Jha et al. |
| 2005/0114496 | A1 | 5/2005 | Fang et al. |
| 2005/0286686 | A1 | 12/2005 | Krstulich |
| 2006/0136372 | A1 | 6/2006 | Schunemann |
| 2006/0288096 | A1 | 12/2006 | Yim |
| 2008/0033794 | A1 | 2/2008 | Ou et al. |
| 2008/0101353 | A1 | 5/2008 | Streijl et al. |
| 2008/0201311 | A1 | 8/2008 | Ertugrul et al. |
| 2008/0281699 | A1 | 11/2008 | Whitehead |
| 2009/0113062 | A1 | 4/2009 | Woodman |
| 2009/0125397 | A1 | 5/2009 | Gomaa et al. |
| 2010/0191577 | A1 | 7/2010 | Lu et al. |
| 2011/0016206 | A1 | 1/2011 | Kodialam et al. |
| 2011/0087780 | A1 | 4/2011 | McCann et al. |
| 2011/0231497 | A1 | 9/2011 | Tovar |
| 2011/0314495 | A1 | 12/2011 | Zenor |
| 2012/0102169 | A1 | 4/2012 | Yu et al. |
| 2012/0124607 | A1 | 5/2012 | Georgakis |
| 2013/0006706 | A1 | 1/2013 | Harvey et al. |
| 2013/0212188 | A1 | 8/2013 | Duterque et al. |
| 2013/0276027 | A1 | 10/2013 | Sheehan et al. |
| 2014/0304397 | A1 * | 10/2014 | DeFrancesco et al. ....... 709/224 |

OTHER PUBLICATIONS

Kihl, Maria, et al., "Traffic analysis and characterization of Internet user behavior", Ultra Modern Telecommunications and Control Systems and Workshops (ICUMT), 2010 International Congress on IEEE, 2010. http://lup.lub.lu.se/luur/download?func=downloadFile&recordOld=1734535&fileOld=2027068.

Xie, Yinglian, et al., "How Dynamic are IP Addresses?", ACM SIGCOMM '07, Kyoto, Japan, Computer Communication Review, vol. 37, No. 4, ACM, Aug. 27-31, 2007. http://131.107.65.14/pubs/63680/sigcomm07-onefile.pdf.

PCT International Search Report and Written Opinion dated Nov. 22, 2013 for PCT Application No. PCT/US13/41307.

* cited by examiner

INTERNET CONNECTED HOUSEHOLD IDENTIFICATION FOR ONLINE MEASUREMENT AND DYNAMIC CONTENT DELIVERY

CROSS-REFERENCE TO RELATED APPLICATIONS

This application claims the benefit under 35 U.S.C. Section 119(e) of the following and commonly-assigned U.S. provisional patent application(s), which is/are incorporated by reference herein:

Provisional Application Ser. No. 61/648,341, filed on May 17, 2012, by Brian C. DeFrancesco, Timothy C. Vanderhook, and Christopher Vanderhook, entitled "INTERNET CONNECTED HOUSEHOLD IDENTIFICATION FOR ONLINE MEASUREMENT & DYNAMIC CONTENT DELIVERY".

BACKGROUND OF THE INVENTION

1. Field of the Invention

The present invention relates generally to identifying users on a network, and in particular, to a method, apparatus, and article of manufacture for identifying households for online measurement and dynamic content delivery.

2. Definitions/Description of the Related Art

Household

The US Census Bureau defines a household as, "A household includes all the persons who occupy a housing unit. A housing unit is a house, an apartment, a mobile home, a group of rooms, or a single room that is occupied (or if vacant, is intended for occupancy) as separate living quarters. Separate living quarters are those in which the occupants live and eat separately from any other persons in the building and which have direct access from the outside of the building or through a common hall. The occupants may be a single family, one person living alone, two or more families living together, or any other group of related or unrelated persons who share living arrangements." (See http://quickfacts.census.gov/qfd/meta/long_HSD310200.htm).

Internet Connected Household (ICH)

An internet connected household is a household that uses the Internet at home. The US Census Bureau reports there are 81,939,000 households that use the Internet at home (internet connected households) in the United States. Source: U.S. Census Bureau, Current Population Survey, October 2009.

Internet Service Provider (ISP)

An ISP is a company that supplies Internet connectivity to home and business customers. ISPs support one or more forms of Internet access, ranging from modem dial-up to DSL (digital subscriber line) and cable modem broadband service to dedicated T1/T3 lines to satellite or wireless access.

Regional Internet Registry

A regional Internet registry (RIR) is an organization that manages the allocation and registration of Internet number resources within a particular region of the world. Internet number resources include IP (internet protocol) addresses and autonomous system (AS) numbers.

The Internet Assigned Numbers Authority (IANA) delegates Internet resources to the RIRs who, in turn, follow their regional policies to delegate resources to their customers, which include Internet service providers and end-user organizations.

Collectively, the RIRs participate in the Number Resource Organization (NRO), formed as a body to represent their collective interests, undertake joint activities, and coordinate their activities globally. The NRO has entered into an agreement with ICANN for the establishment of the Address Supporting Organisation (ASO), which undertakes coordination of global IP addressing policies within the ICANN framework. (See http://en.wikipedia.org/wiki/Regional_Internet_registry).

Internet Protocol Address (IP)

An IP address is a logical address for a network adapter. Generally speaking, an IP address uniquely identifies computers on a TCP/IP network (transmission control protocol/Internet protocol network).

An IP address can be private—for use on a local area network (LAN)—or public—for use on the Internet or other wide area network (WAN). IP addresses can be determined statically (assigned to a computer by a system administrator) or dynamically (assigned by another device on the network on demand).

Two IP addressing standards are in use today. The IPv4 standard is most familiar to people and supported everywhere on the Internet, but the newer IPv6 standard is planned to replace it and is starting to be deployed.

IPv4 addresses consist of four bytes (32 bits). Each byte of an IP address is known as an octet. Octets can take any value between 0 and 255. Various conventions exist for the numbering and use of IP addresses. (See http://compnetworking.about.com/od/workingwithipaddresses/g/ip-addresses.htm).

Transmission Control Protocol/Internet Protocol (TCP/IP)

TCP/IP is the communication protocol for the Internet. A computer communication protocol is a description of the rules computers must follow to communicate with each other. TCP/IP defines how electronic devices (like computers) should be connected to the Internet, and how data should be transmitted between them. Each computer must have an IP address before it can connect to the Internet and each IP packet must have an address before it can be sent to another computer. (See http://www.w3schools.com/tcpip/tcpip_intro.asp).

Hypertext Transfer Protocol (HTTP)

The Hypertext Transfer Protocol provides a standard for Web browsers and servers to communicate. HTTP is an application layer network protocol built on top of TCP. HTTP clients (such as Web browsers) and servers communicate via HTTP request and response messages. (See http://compnetworking.about.com/od/networkprotocols/g/bldef_http.htm).

SUMMARY OF THE INVENTION

Embodiments of the invention provide for an "Internet Connected Household Identification." Such an identification is a system for identifying "Households" for use in online media measurement including but not limited to website analytics, consumer interests and profiling, purchase activity, social activity and dynamic content delivery including but not limited to media (music, video, or any multimedia digital streaming format), advertisements, and text/graphic content (articles, links, images, animations, etc.).

BRIEF DESCRIPTION OF THE DRAWINGS

Referring now to the drawings in which like reference numbers represent corresponding parts throughout.

DETAILED DESCRIPTION OF THE PREFERRED EMBODIMENTS

Figure 1:
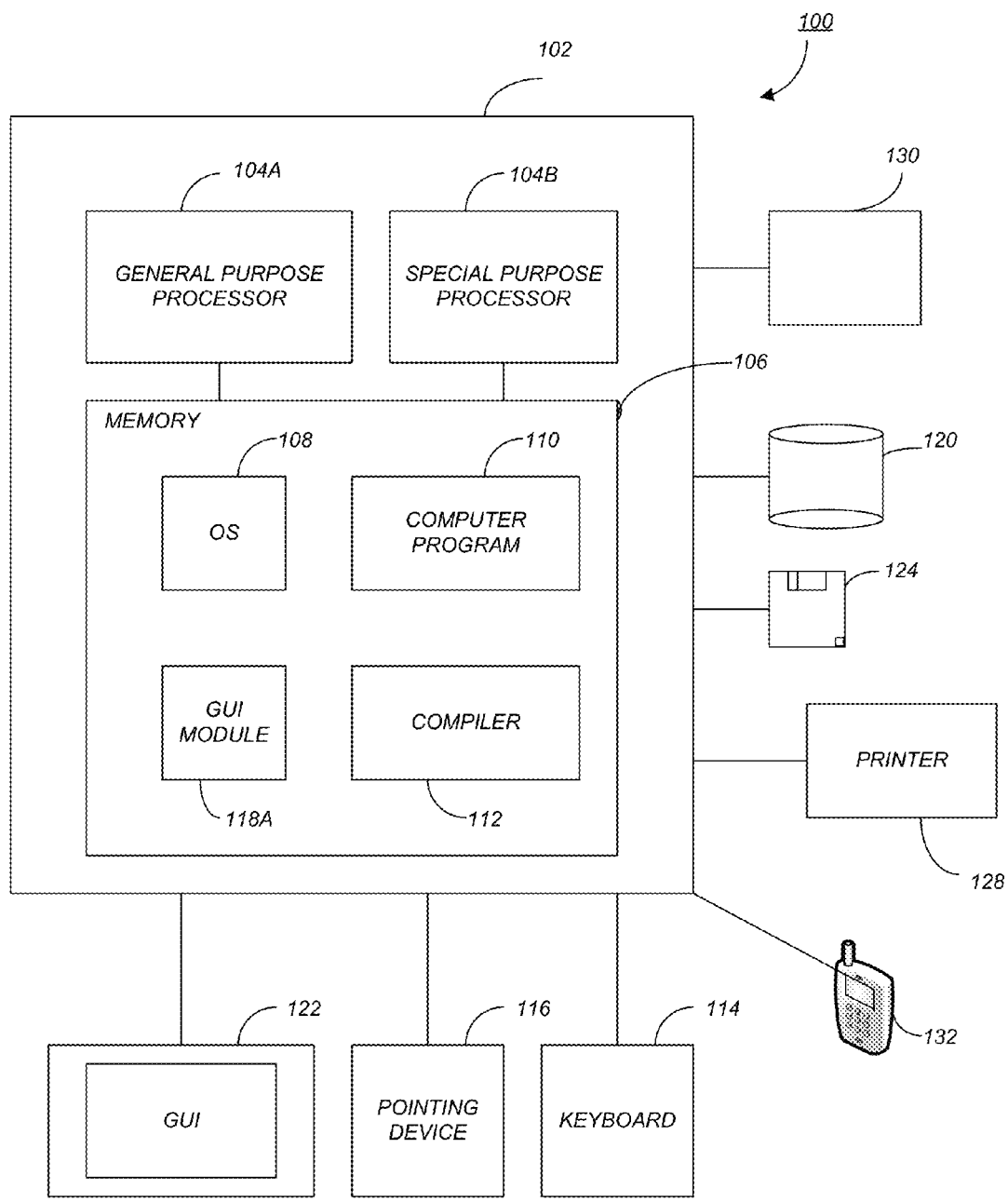
FIG. 1 is an exemplary hardware and software environment used to implement one or more embodiments of the invention.

In the following description, reference is made to the accompanying drawings which form a part hereof, and which is shown, by way of illustration, several embodiments of the present invention. It is understood that other embodiments may be utilized and structural changes may be made without departing from the scope of the present invention.
Overview Embodiments of the invention evaluate the IP address associated with a client computer request and determine whether the IP address belongs to an ISP that provides residential internet service. Further determinations are made regarding device activity (from the device associated with the IP address) (e.g., whether it exceeds a threshold level of activity expected from a household), and an IP assignment age (e.g., whether the age of the IP address exceeds a threshold age associated with households). Based on the determinations, a further determination can be made regarding whether the IP address/web request originates from an ICH.
Hardware Environment FIG. 1 is an exemplary hardware and software environment 100 used to implement one or more embodiments of the invention. The hardware and software environment includes a computer 102 and may include peripherals. Computer 102 may be a user/client computer, server computer, or may be a database computer. The computer 102 comprises a general purpose hardware processor 104A and/or a special purpose hardware processor 104B (hereinafter alternatively collectively referred to as processor 104) and a memory 106, such as random access memory (RAM). The computer 102 may be coupled to, and/or integrated with, other devices, including input/output (I/O) devices such as a keyboard 114, a cursor control device 116 (e.g., a mouse, a pointing device, pen and tablet, touch screen, multi-touch device, etc.) and a printer 128. In one or more embodiments, computer 102 may be coupled to, or may comprise, a portable or media viewing/listening device 132 (e.g., an MP3 player, iPod™, Nook™, portable digital video player, cellular device, personal digital assistant, etc.). In yet another embodiment, the computer 102 may comprise a multi-touch device, mobile phone, gaming system, internet enabled television, television set top box, or other internet enabled device executing on various platforms and operating systems.

In one embodiment, the computer 102 operates by the general purpose processor 104A performing instructions defined by the computer program 110 under control of an operating system 108. The computer program 110 and/or the operating system 108 may be stored in the memory 106 and may interface with the user and/or other devices to accept input and commands and, based on such input and commands and the instructions defined by the computer program 110 and operating system 108, to provide output and results.

Output/results may be presented on the display 122 or provided to another device for presentation or further processing or action. In one embodiment, the display 122 comprises a liquid crystal display (LCD) having a plurality of separately addressable liquid crystals. Alternatively, the display 122 may comprise a light emitting diode (LED) display having clusters of red, green and blue diodes driven together to form full-color pixels. Each liquid crystal or pixel of the display 122 changes to an opaque or translucent state to form a part of the image on the display in response to the data or information generated by the processor 104 from the application of the instructions of the computer program 110 and/or operating system 108 to the input and commands. The image may be provided through a graphical user interface (GUI) module 118A. Although the GUI module 118A is depicted as a separate module, the instructions performing the GUI functions can be resident or distributed in the operating system 108, the computer program 110, or implemented with special purpose memory and processors.

In one or more embodiments, the display 122 is integrated with/into the computer 102 and comprises a multi-touch device having a touch sensing surface (e.g., track pod or touch screen) with the ability to recognize the presence of two or more points of contact with the surface. Examples of multi-touch devices include mobile devices (e.g., iPhone™, Nexus S™, Droid™ devices, etc.), tablet computers (e.g., iPad™, HP Touchpad™), portable/handheld game/music/video player/console devices (e.g., iPod Touch™, MP3 players, Nintendo 3DS™, PlayStation Portable™, etc.), touch tables, and walls (e.g., where an image is projected through acrylic and/or glass, and the image is then backlit with LEDs).

Some or all of the operations performed by the computer 102 according to the computer program 110 instructions may be implemented in a special purpose processor 104B. In this embodiment, some or all of the computer program 110 instructions may be implemented via firmware instructions stored in a read only memory (ROM), a programmable read only memory (PROM), or flash memory within the special purpose processor 104B or in memory 106. The special purpose processor 104B may also be hardwired through circuit design to perform some or all of the operations to implement the present invention. Further, the special purpose processor 104B may be a hybrid processor, which includes dedicated circuitry for performing a subset of functions, and other circuits for performing more general functions such as responding to computer program instructions. In one embodiment, the special purpose processor is an application specific integrated circuit (ASIC).

The computer 102 may also implement a compiler 112 that allows an application program 110 written in a programming language such as COBOL, Pascal, C++, FORTRAN, or other language to be translated into processor 104 readable code. Alternatively, the compiler 112 may be an interpreter that executes instructions/source code directly, translates source code into an intermediate representation that is executed, or that executes stored precompiled code. Such source code may be written in a variety of programming languages such as Java™, Perl™, Basic™, etc. After completion, the application or computer program 110 accesses and manipulates data accepted from I/O devices and stored in the memory 106 of the computer 102 using the relationships and logic that were generated using the compiler 112.

The computer 102 also optionally comprises an external communication device such as a modem, satellite link, Ethernet card, or other device for accepting input from, and providing output to, other computers 102.

In one embodiment, instructions implementing the operating system 108, the computer program 110, and the compiler 112 are tangibly embodied in a non-transient computer-readable medium, e.g., data storage device 120, which could include one or more fixed or removable data storage devices, such as a zip drive, floppy disc drive 124, hard drive, CD-ROM drive, tape drive, etc. Further, the operating system 108 and the computer program 110 are comprised of computer program instructions which, when accessed, read and executed by the computer 102, cause the computer 102 to perform the steps necessary to implement and/or use the present invention or to load the program of instructions into a memory, thus creating a special purpose data structure causing the computer to operate as a specially programmed computer executing the method steps described herein. Computer program 110 and/or operating instructions may also be tangibly embodied in memory 106 and/or data communications devices 130, thereby making a computer program product or article of manufacture according to the invention. As such, the terms "article of manufacture," "program storage device," and "computer program product," as used herein, are intended to encompass a computer program accessible from any computer readable device or media.

Of course, those skilled in the art will recognize that any combination of the above components, or any number of different components, peripherals, and other devices, may be used with the computer 102.

Figure 2:
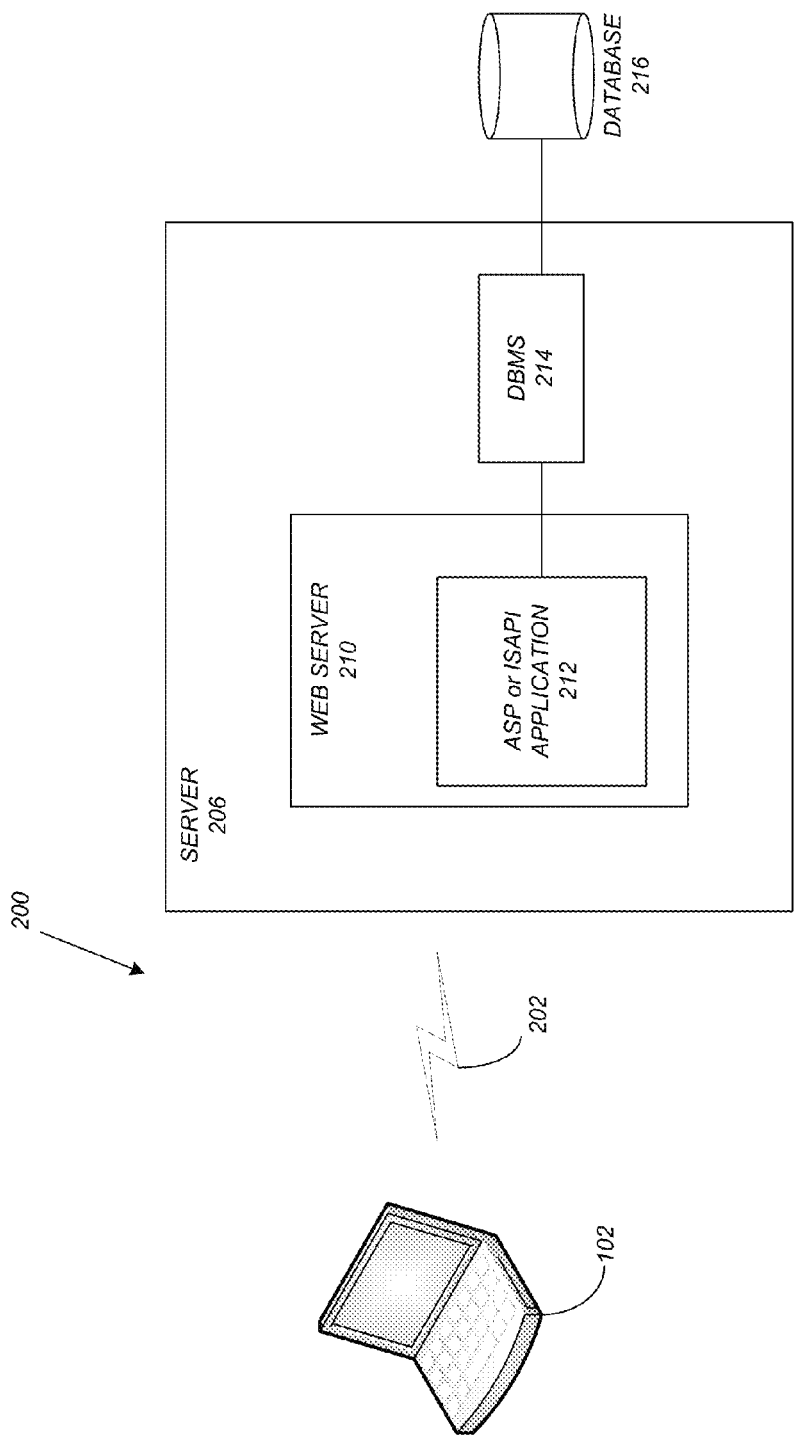
FIG. 2 schematically illustrates a typical distributed computer system utilized in accordance with one or more embodiments of the invention.

FIG. 2 schematically illustrates a typical distributed computer system 200 using a network 202 to connect client computers 102 to server computers 206. A typical combination of resources may include a network 202 comprising the Internet, LANs (local area networks), WANs (wide area networks), SNA (systems network architecture) networks, or the like, clients 102 that are personal computers or workstations, and servers 206 that are personal computers, workstations, mini-computers, or mainframes (as set forth in FIG. 1). However, it may be noted that different networks such as a cellular network (e.g., GSM [global system for mobile communications] or otherwise), a satellite based network, or any other type of network may be used to connect clients 102 and servers 206 in accordance with embodiments of the invention.

A network 202 such as the Internet connects clients 102 to server computers 206. Network 202 may utilize ethernet, coaxial cable, wireless communications, radio frequency (RF), etc. to connect and provide the communication between clients 102 and servers 206. Clients 102 may execute a client application or web browser and communicate with server computers 206 executing web servers 210. Such a web browser is typically a program such as MICROSOFT INTERNET EXPLORER™, MOZILLA FIREFOX™, OPERA™, APPLE SAFARI™, GOOGLE CHROME™, etc. Further, the software executing on clients 102 may be downloaded from server computer 206 to client computers 102 and installed as a plug-in or ACTIVEX™ control of a web browser. Accordingly, clients 102 may utilize ACTIVEX™ components/component object model (COM) or distributed COM (DCOM) components to provide a user interface on a display of client 102. The web server 210 is typically a program such as MICROSOFT'S INTERNET INFORMATION SERVER™.

Web server 210 may host an Active Server Page (ASP) or Internet Server Application Programming Interface (ISAPI) application 212, which may be executing scripts. The scripts invoke objects that execute business logic (referred to as business objects). The business objects then manipulate data in database 216 through a database management system (DBMS) 214. Alternatively, database 216 may be part of, or connected directly to, client 102 instead of communicating/obtaining the information from database 216 across network 202. When a developer encapsulates the business functionality into objects, the system may be referred to as a component object model (COM) system. Accordingly, the scripts executing on web server 210 (and/or application 212) invoke COM objects that implement the business logic. Further, server 206 may utilize MICROSOFT'S™ Transaction Server (MTS) to access required data stored in database 216 via an interface such as ADO (Active Data Objects), OLE DB (Object Linking and Embedding DataBase), or ODBC (Open DataBase Connectivity).

Generally, these components 200-216 all comprise logic and/or data that is embodied in/or retrievable from device, medium, signal, or carrier, e.g., a data storage device, a data communications device, a remote computer or device coupled to the computer via a network or via another data communications device, etc. Moreover, this logic and/or data, when read, executed, and/or interpreted, results in the steps necessary to implement and/or use the present invention being performed.

Although the terms "user computer", "client computer", and/or "server computer" are referred to herein, it is understood that such computers 102 and 206 may be interchangeable and may further include thin client devices with limited or full processing capabilities, portable devices such as cell phones, notebook computers, pocket computers, multi-touch devices, and/or any other devices with suitable processing, communication, and input/output capability.

Of course, those skilled in the art will recognize that any combination of the above components, or any number of different components, peripherals, and other devices, may be used with computers 102 and 206.

Internet Connected Household Identification

Figure 3:
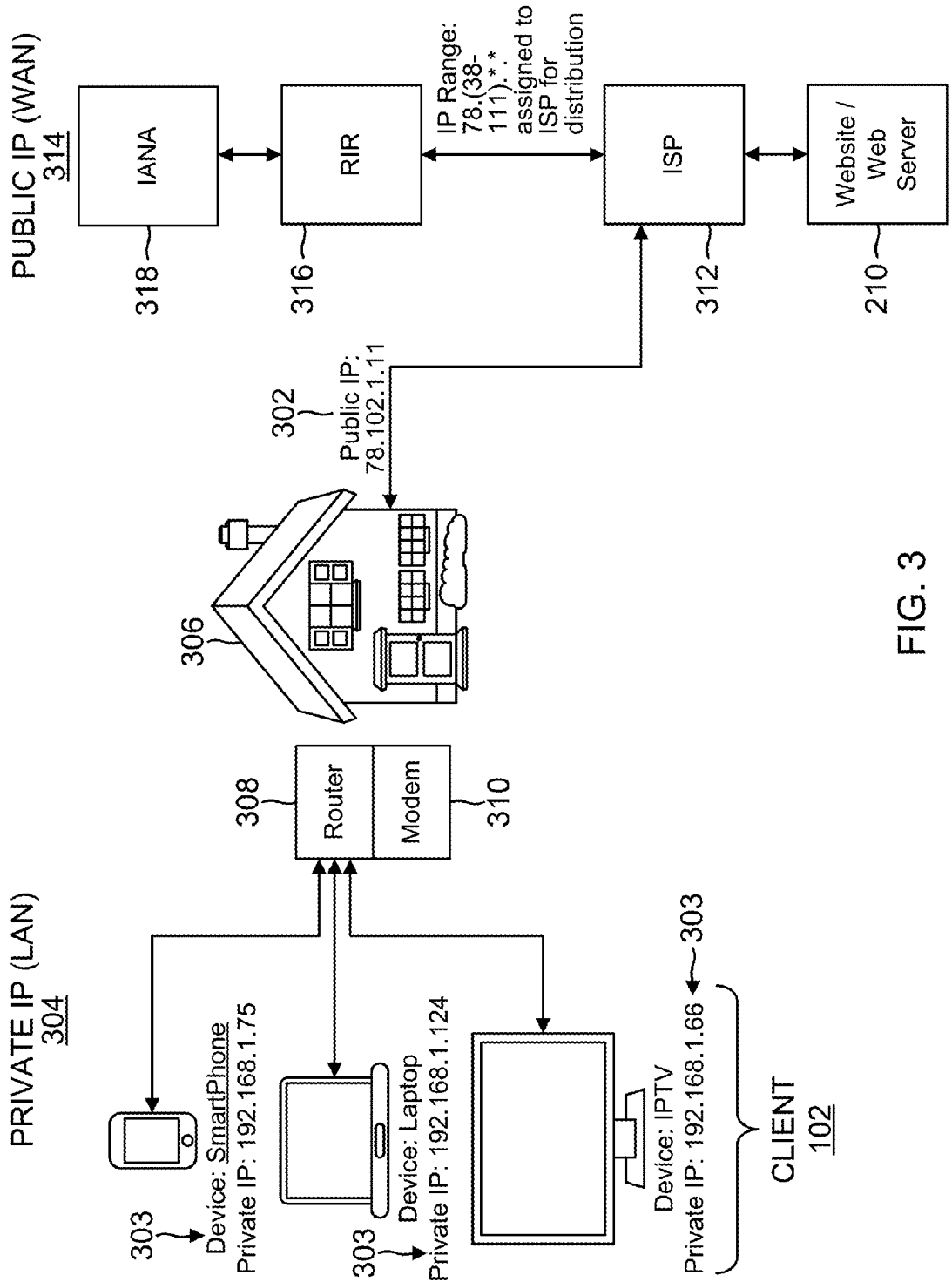
FIG. 3 illustrates an additional implementation of a network and communication on such a network in accordance with one or more embodiments of the invention.

FIG. 3 illustrates an additional implementation of a network and communication on such a network in accordance with one or more embodiments of the invention. As consumers/clients 102 use the Internet 202 to connect with web server(s) 210 via HTTP(s), a Public IP address 302 is attached to each HTTP request that generates as a result of such web browsing activity.

In a typical scenario, the devices 102 inside a household are on a Local Area Network (LAN) 304 that is private to the Household 306. The IP address of each device 102 (IP addresses 303) within the household 306 is assigned by the router 308 (or modem 310). The modem 310 communicates with and receives Internet access from the ISP 312 on a wide area network (WAN) 314 that is usually public. The IP address 302 assigned to the home's modem 310 by the ISP 312 is public as it's what is used in communication with an outside web server 210.

In some cases, multiple homes 306 will be pooled together and will share the same public IP 302. These are typically in the cases of shared internet (apartment complex, college/university housing, etc).

Furthermore, the public IP addresses 302 that the ISP 312 assigns to the household's modem 310 may be static or dynamic. In either case, the main relevant measure is the "stickiness" or age of the IP assignment. For example, if an IP 302 is assigned dynamically, but only on the reset of a modem 310, and the modem 310 is only reset once a year, the age of the IP address assignment for the Household 306 is one year.

When Household IPs assignment ages exceed a significant number of days, the Household public IP address 302 may serve as a unique identifier for all internet connected device 102 activity from within the Household 306 that are using the Household's ISP internet connection (all devices 102 will show the same public IP address 302 when they connect to web servers 210).

The system of Household identification (of embodiments of the invention) may use multiple criteria to evaluate each public IP address 302, that an internet entity with web servers 210 receives, to determine if each IP address 302 belongs to a Household 306.

Criteria 1: Public IP Belongs to an ISP that Provides Residential Internet Service Every public IP address is registered with a RIR 316 (regional internet registry), and in general, most are a part of larger IP range blocks that belong to ISPs 312. This data is publicly available and each organization (ISP) 312 can be classified as providing or not providing residential internet service based on publicly available information regarding the company and their offerings.

Figure 4:
FIG. 4 illustrates publicly available "who-is" information that is utilized in accordance with one or more embodiments of the invention.

For example, FIG. 4 illustrates the publicly available "who-is" information for the IP addresses 174.0.0.0/8 and 174.141.0.0/17 performed using ARIN (American Registry for Internet Numbers). The IP address 174.0.0.0/8 is part of a larger range block of IP addresses (i.e., 174.0.0.0-174.255.255.255) that is allocated to ARIN (an RIR). Using the information from ARIN, the IP address block ranges assigned to different organizations can be determined. As illustrated, the IP address 174.141.0.0/17 is part of a range block of IP addresses (i.e., 174.141.0.0-174.141.127.255) that are directly allocated to Windstream Nuvox, Inc. Windstream Nuvox is an ISP that provides residential internet service.

Accordingly, if an IP address 302 is registered with an RIR 316 (e.g., in a particular region of the world) and is part of an IP range block that belongs to an ISP that provides residential internet service, a determination can be made that the IP address 302 may be for an ICH. Similarly, if the ISP for that IP address does not provide residential service, a determination can be made that the IP address is not for an ICH.

Criteria 2: Device Activity from IP does not Exceed Threshold for ICH Usage Over a Period of Time By monitoring the activity (devices, users, events) for each IP address over a defined period of time (example 30 days), the IP addresses that are used by non-Households (businesses and other organization) are filtered out by the level of activity observed from these IPs over the time period.

For example, if there are 200 devices and 100 users that connect from the same IP address, the IP address may be associated with significant activity and is therefore likely that of a business or other (non-Household) organization.

In other words, the activity for each IP address is monitored over a defined period of time. If significant activity is found (i.e., above a threshold level) from a single IP address, it can be determined that the IP address is not for an ICH.

In addition to filtering out business and organizations, such a criteria also provides a method to remove a small percentage of households 306 that have a short-lived IP assignment age. In this regard, if the IP is assigned frequently to households 306 in the ISP's customer base, the users and devices 102 from that IP accumulate and exceed the threshold to be considered a unique household identifier for any substantial period of time.

Criteria 3: The IP Assignment Age Must be Greater than 45 Days

In order to ensure an IP address is static enough that it can serve as an identifier for a reasonable period of time, the IP "stickiness" or assignment age is used. This is determined by observing the number of connecting IP addresses from the same ISP 312 over a defined period of time (e.g., 90 days). In other words, a determination is made if multiple different IP addresses are connected to each other and the combined IP assignment age of the "connected" IP addresses are utilized in the comparison to the threshold IP assignment age (i.e., 45 days).

A "connection" between two or more IP addresses belonging to the same ISP 312 is made when an identified user has generated activity from two IP addresses. For example, if a laptop user is indentified (e.g., by a cookie) as user 123456 and the laptop participates in web browsing from within an ICH with public IP 100.100.1.1, and then two days later the ICH's IP is changed to 200.200.1.1 by the ISP 312, then the same user who generated activity behind 100.100.1.1 is found generating activity behind IP 200.200.1.1 which creates a connection between these two IP addresses. In other words, the same user is identified as belonging to the two IP addresses (e.g., using the cookie) and the activity on the combined connected IP addresses are utilized when determining if the IP assignment age is greater or less than 45 days.

Beyond a threshold of allowed connections (from people physically using a device inside another household 306—e.g., visiting a friend), the connection rate and volume will filter short aged IP assignments from being identified as Internet connected households 306 for use in measurement and content distribution.

This provides an additional method to remove a small percentage of households 306 that have a small IP assignment age as these IPs are assigned frequently to households 306 in the ISP's customer base and the users and devices from that IP accumulate and exceed the threshold to be considered a unique household identifier for any substantial period of time.

EXAMPLES

The application of ICH identification for media includes, but is not limited to, measurement of distribution and dynamic content delivery, optimization and recommendation.

Measurement of Distribution/Exposure:

For online/web content owners or distribution/syndication partners, ICH identification provides a method to measure the total ICH's exposure to their content.

For advertiser, website owners, and analytics firms, ICH identification provides a standard measurement of ICH reach/exposure, advertising return on investment (ROI), and de-duplicated visitation statistics.

Content Delivery, Optimization, Recommendation:

ICH data can be collected to create data stores that include interests, activities (e.g., ads viewed), actions (e.g., visit to marketer's website). Such data stores can be leveraged to aid in dynamic content selection for content to be delivered to an application or webpage. In addition, it can serve to optimize the placement, order, and display of such content, and provide recommendations to household users for additional content engagement.

Logical Flow

Figure 5:
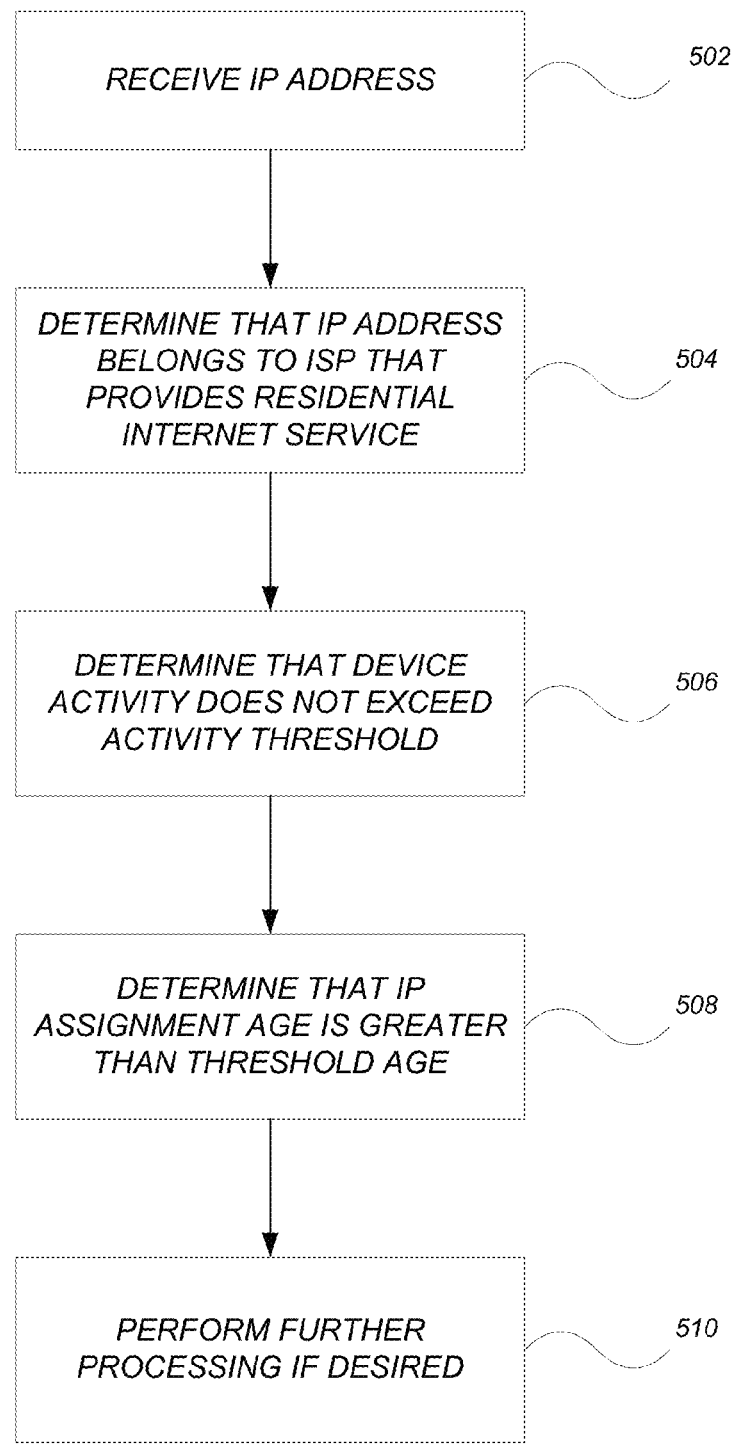
FIG. 5 is a flow chart illustrating the logical flow for identifying an internet connected household in accordance with one or more embodiments of the invention.

FIG. 5 is a flow chart illustrating the logical flow for identifying an internet connected household in accordance with one or more embodiments of the invention.

At step 502, an IP address is received at an Internet entity. For example, the IP address may be attached to an HTTP request received at a web server.

At step 504, a determination is made regarding whether the IP address belongs to an ISP that provides residential internet service (e.g., referred to herein as the residential internet service status). In this regard, based on information from an RIR, the ISP assigned an IP range block (that includes the IP address) can be identified. Thereafter, based on publicly available information, the ISP can be classified as providing or not providing residential internet service. Accordingly, step 504 serves to filter out IP addresses (from further processing) that are from non-residential service based ISPs (e.g., those that solely provide business based services). In one or more embodiments, the publicly available information may be gathered and stored in a database (local or network based). Thus, the database may include ISPs that provide residential service, ISPs that do not provide residential service (and/or both). A simple comparison of the ISP to the list of ISPs in the database may be conducted to determine whether the IP address belongs to an ISP that provides residential internet service.

At step 506, a determination is made regarding whether the device activity from the IP address exceeds a defined activity threshold (e.g., referred to herein as a device activity status). To make such a determination, activity from the IP address may be monitored over a period of time. Further, a "defined activity threshold" for the level of activity for ICHs may be determined. For example, the average level of activity for ICHs may be determined based on monitoring such activity over a period of time. Alternatively, any other method may be used to determine the activity threshold (e.g., a user specified level of activity, an ISP specified level of activity, etc.). Once the defined activity threshold has been determined (e.g., obtained from a database, computed, etc.), the level is compared to the level of activity from the IP address that has been monitored. If the level of activity exceeds the activity threshold, the system assumes that the IP address is not for an ICH, and filters out the IP address from further processing. However, if the level of activity does not exceed the activity threshold, then the IP address is not eliminated from further consideration/processing.

At step 508, a determination is made regarding whether the IP assignment age for the IP address is greater than a defined threshold age (referred to herein as the IP assignment age status). In this regard, step 508 is used to ensure that the IP address is static enough that it can serve as an identifier for a reasonable period of time. In other words, to effectively use an IP address for further processing, the IP address must be static enough that it identifies a particular household.

Often times, an IP address is reassigned when a household restarts a modem or for a variety of other reasons. Accordingly, embodiments of the invention may observe a number of connecting IP addresses from the ISP over a defined period of time. As described above, two IP addresses belonging to the same ISP are "connected" when a user has generated activity from both of the two IP addresses (e.g., the user may be identified from a cookie, username, registration, etc.). A large increase in the IP's number of connecting IPs or users indicates the IP may have rotated and the assignment age is set back to zero (0) days making it invalid to serve as a unique identifier until its assignment age regains maturity.

Once the IP assignment age for the connecting IP addresses is computed, it can be compared to a threshold age (e.g., 45 days) to determine if the address is static enough to use for further processing.

At step 510, it may be determined that the IP address corresponds to an ICH (e.g., per steps 502-506) with sufficient information (e.g. per step 508) to enable additional processing. Thus, based on the residential internet service status, device activity status, and IP assignment age status, a determination can be made regarding whether the IP address is associated with an ICH or not.

If the IP address is associated with/corresponds to an ICH, additional processing may be performed. Such additional processing may measure the ICH's exposure to content from a specific content owner. Alternatively, a data store may be created based on the device activity from the ICH. The data store may be used to store information regarding interests, activity, and actions from the device. Based on the data store, additional content (e.g., advertising or other content) may be dynamically selected for delivery to the device.

Conclusion

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method for identifying an internet connected household (ICH), comprising:
   receiving an Internet Protocol (IP) address at an Internet entity;
   determining a residential internet service status based on whether the IP address belongs to an Internet Service Provider (ISP) that provides residential internet service;
   determining a device activity status based on whether device activity from the IP address does not exceed a defined activity threshold;
   determining an IP assignment age status based on whether an IP assignment age for the IP address is greater than a defined threshold age; and
   based on the residential internet service status, the device activity status, and the IP assignment age status, determining whether the IP address is associated with an ICH.

2. The computer-implemented method of claim 1, wherein:
   the IP address is attached to a Hypertext Transfer Protocol (HTTP) request received by the Internet entity; and
   the Internet entity has a web server.

3. The computer-implemented method of claim 1, wherein the determining the residential internet service status comprises:
   determining, based on information obtained from a regional internet registry (RIR), the ISP that has been assigned an IP range block that includes the IP address; and
   classifying the ISP as providing residential internet service based on publicly available information regarding the ISP.

4. The computer-implemented method of claim 1, wherein the determining the residential internet service status further comprises:
   receiving an additional IP address at the Internet entity;
   determining whether the additional IP address belongs to a second ISP that does not provide residential internet service; and
   filtering out the additional IP address from further processing.

5. The computer-implemented method of claim 1, wherein the determining the device activity status comprises:

monitoring activity from the IP address over a defined period of time;
determining the defined activity threshold for a level of activity for internet connected households; and
determining that the level of activity from the IP address does not exceed the defined activity threshold.

6. The computer-implemented method of claim 1, wherein the determining the device activity status comprises:
receiving an additional IP address at the Internet entity; and
determining that device activity from the additional IP address is below the defined activity threshold;
determining that the additional IP address is associated with a non-household based on the device activity; and
filtering out the non-household and the additional IP address from further processing.

7. The computer-implemented method of claim 1, wherein the determining the IP assignment age status comprises:
observing a number of connecting IP addresses from the ISP over a defined period of time;
calculating the IP assignment age for the IP address by monitoring the number of connecting IP addresses to identify if and when the IP has been reassigned; and
determining that the IP assignment age is greater than the defined threshold age.

8. The computer-implemented method of claim 7, wherein two IP addresses belonging to the ISP are connected when a user has generated activity from both of the two IP addresses.

9. The computer-implemented method of claim 1, wherein the defined threshold age is forty-five (45) days.

10. The computer-implemented method of claim 1, further comprising:
based on the determining steps, measuring the ICH's exposure to content from a specific content owner.

11. The computer-implemented method of claim 1, further comprising:
creating a data store based on the device activity from the ICH, wherein the data store comprises interests, activity, and actions from a device; and
based on the data store, dynamically selecting content to be delivered to the device.

12. A non-transitory computer readable storage medium encoded with computer program instructions which when accessed by a computer cause the computer to load the program instructions to a memory therein creating a special purpose data structure causing the computer to operate as a specially programmed computer, executing a method of identifying an internet connected household (ICH), comprising:
receiving, in the specially programmed computer at an Internet entity, an Internet Protocol (IP) address;
determining, in the specially programmed computer, a residential internet service status based on whether the IP address belongs to an Internet Service Provider (ISP) that provides residential internet service;
determining, in the specially programmed computer, a device activity status based on whether device activity from the IP address does not exceed a defined activity threshold;
determining, in the specially programmed computer, an IP assignment age status based on whether an IP assignment age for the IP address is greater than a defined threshold age; and
based on the residential internet service status, the device activity status, and the IP assignment age status, determining, in the specially programmed computer, whether the IP address is associated with an ICH.

13. The non-transitory computer readable storage medium of claim 12, wherein:

the IP address is attached to a Hypertext Transfer Protocol (HTTP) request received by the Internet entity; and
the Internet entity has a web server.

14. The non-transitory computer readable storage medium of claim 12, wherein the determining the residential internet service status comprises:
determining, based on information obtained from a regional internet registry (RIR), the ISP that has been assigned an IP range block that includes the IP address; and
classifying the ISP as providing residential internet service based on publicly available information regarding the ISP.

15. The non-transitory computer readable storage medium of claim 12, wherein the determining the residential internet service status further comprises:
receiving an additional IP address at the Internet entity;
determining whether the additional IP address belongs to a second ISP that does not provide residential internet service; and
filtering out the additional IP address from further processing.

16. The non-transitory computer readable storage medium of claim 12, wherein the determining the device activity status comprises:
monitoring activity from the IP address over a defined period of time;
determining the defined activity threshold for a level of activity for internet connected households; and
determining that the level of activity from the IP address does not exceed the defined activity threshold.

17. The non-transitory computer readable storage medium of claim 12, wherein the determining the device activity status comprises:
receiving an additional IP address at the Internet entity; and
determining that device activity from the additional IP address is below the defined activity threshold;
determining that the additional IP address is associated with a non-household based on the device activity; and
filtering out the non-household and the additional IP address from further processing.

18. The non-transitory computer readable storage medium of claim 12, wherein the determining the IP assignment age status comprises:
observing a number of connecting IP addresses from the ISP over a defined period of time;
calculating the IP assignment age for the IP address by monitoring the number of connecting IP addresses to identify if and when the IP has been reassigned; and
determining that the IP assignment age is greater than the defined threshold age.

19. The non-transitory computer readable storage medium of claim 18, wherein two IP addresses belonging to the ISP are connected when a user has generated activity from both of the two IP addresses.

20. The non-transitory computer readable storage medium of claim 12, wherein the defined threshold age is forty-five (45) days.

21. The non-transitory computer readable storage medium of claim 12, further comprising:
based on the determining steps, measuring the ICH's exposure to content from a specific content owner.

22. The non-transitory computer readable storage medium of claim 12, further comprising:
creating a data store based on the device activity from the ICH, wherein the data store comprises interests, activity, and actions from a device; and based on the data store, dynamically selecting content to be delivered to the device.

* * * * *